US012794319B2

(12) United States Patent
Lyubar et al.

(10) Patent No.: US 12,794,319 B2
(45) Date of Patent: Nov. 10, 2026

(54) AXIAL FLOW MOTOR WITH IMPROVED ROTOR COOLING

(71) Applicant: Vitesco Technologies GmbH, Regensburg (DE)

(72) Inventors: Anatoliy Lyubar, Wolfsegg (DE); Ferdinand Löbbering, Alteglofsheim (DE); Axel Burkhardt, Mühlhacker (DE); Ivan Krotow, Regensburg (DE)

(73) Assignee: Vitesco Technologies GmbH, Regensburg (DE)

(*) Notice: Subject to any disclaimer, the term of this patent is extended or adjusted under 35 U.S.C. 154(b) by 196 days.

(21) Appl. No.: 18/785,271

(22) Filed: Jul. 26, 2024

(65) Prior Publication Data

US 2025/0038622 A1 Jan. 30, 2025

(30) Foreign Application Priority Data

Jul. 28, 2023 (DE) ..................... 10 2023 207 239.4

(51) Int. Cl.
*H02K 9/19* (2006.01)
*H02K 21/24* (2006.01)

(52) U.S. Cl.
CPC ............... *H02K 9/19* (2013.01); *H02K 21/24* (2013.01)

(58) Field of Classification Search
CPC ................................. H02K 9/19; H02K 21/24
See application file for complete search history.

(56) References Cited

U.S. PATENT DOCUMENTS

2016/0204678 A1* 7/2016 Woolmer ................. H02K 9/19 310/54
2017/0131158 A1* 5/2017 Matsubara .............. H02P 29/60
2023/0019894 A1* 1/2023 Lee .......................... H02K 1/28

FOREIGN PATENT DOCUMENTS

DE 102014213452 1/2016
DE 102014213452 A1 * 1/2016 ............... H02K 9/08
DE 102020101979 8/2020
DE 102021102805 9/2021
EP 2835895 2/2015

OTHER PUBLICATIONS

English translation of DE-102014213452-A1 (Year: 2014).*
Office Action of corresponding German Patent Application No. 10 2023 207 239.4, dated May 11, 2024.

* cited by examiner

*Primary Examiner* — Sean Gugger
(74) *Attorney, Agent, or Firm* — COZEN O'CONNOR

(57) ABSTRACT

An axial flow motor having a housing with at least one disc-shaped stator arranged in the housing and at least one disc-shaped rotor, which is arranged opposite the disc-shaped stator along a rotational axis of the motor and separated therefrom by an air gap. One or more nozzles are arranged in the housing, the nozzles are configured to deliver a liquid coolant to the rotor surface facing the stator.

10 Claims, 2 Drawing Sheets

AXIAL FLOW MOTOR WITH IMPROVED ROTOR COOLING

BACKGROUND OF THE INVENTION

1. Field of the Invention

The present disclosure concerns an axial flow motor, and in particular an axial flow motor with improved rotor cooling.

2, Description of Related Art

Electric motors are becoming ever more important in mobile applications. For use as drives in vehicles, as well as radial flow motors, axial flow motors are used ever more frequently because of their compact design, energy efficiency, and achievable torque levels; such motors have an opposing arrangement of a stator and at least one rotor inside a housing. In order to allow efficient operation of axial flow motors even at high rotation speeds, effective cooling of the rotors is advantageous. Cooling may prevent overheating of the motor, which could lead to demagnetization of magnets or thermal damage to further motor components.

SUMMARY OF THE INVENTION

Known rotor cooling systems however still have potential for improvement.

It is an object of one aspect of the present invention to overcome at least partially at least one disadvantage of the prior art. In particular, to provide a solution for effective rotor cooling in axial flow motors, by which the electrical and mechanical efficiency and the durability of the motors are improved.

One aspect of the present invention is an axial flow motor comprising a housing with at least one disc-shaped stator arranged in the housing and at least one disc-shaped rotor, which is arranged opposite the disc-shaped stator along the rotational axis of the motor and separated therefrom by an air gap, wherein one or more nozzles are arranged in the housing, wherein the nozzles are configured to deliver a liquid coolant to the rotor surface facing the stator.

Such an axial flow motor has significant advantages in comparison with solutions from the prior art.

An axial flow motor is thus described. Such an axial flow motor may have a basic structure configured in a manner known in itself. The motor comprises a coreless disc-shaped stator and opposite this a coreless disc-shaped actuator also known as a rotor, wherein the magnetic field driving the rotor runs parallel to the rotational axis of the rotor and the stator. The rotor is set in motion by electrical actuation of the stator, and for example drives an axle or a wheel. With respect to dimensions and performance data, the axial flow motor may be adapted to the selected area of application, i.e. for example the type of vehicle or component to be driven by the electric motor.

The axial flow motor furthermore comprises a housing. The housing serves to receive various components of the electric motor. In order to receive the stator-actuator arrangement, the housing of the electric motor comprises an in particular cylindrical housing part. Because of a cylindrical shape, the housing part can be best adapted to the external shape of the stator-actuator arrangement.

In the axial flow motor described here, it is furthermore provided that one or more nozzles are arranged in the housing, wherein the nozzles are configured to deliver a liquid coolant to the rotor surface facing the stator. The nozzles are accordingly part of a cooling system and may deliver a liquid coolant to the rotor surface. The delivery of the liquid coolant may take place for example via spraying, dripping or generally expulsion of the coolant through the nozzle. For this, the nozzles may be arranged either on or in the housing wall, or on the stator or the shaft. It is also possible that nozzles are provided both on or in the vicinity of the stator, and nozzles on or in the vicinity of the housing wall, insofar as the outlet direction of the coolant is oriented towards the rotor surface. Preferably, more than 2, furthermore preferably more than 4, and furthermore preferably more than 8 nozzles may be used in the motor for cooling a rotor. Furthermore, one or more nozzles may also be provided on the rotor itself, wherein these allow delivery of coolant to the surface of the rotor. The liquid coolant may in principle be any coolant with adequate thermal capacity known to the person skilled in the art. A nozzle means a mostly cylindrical hollow body which allows a targeted outlet of a liquid stream through an opening. Via this structure, only one surface side of the rotor is cooled. The surface side of the rotor facing away from the stator is not brought into contact with the cooling liquid by the settings of the nozzles. Irrespective thereof, the opposite rotor side may however also be cooled independently.

According to one aspect of the invention, the specific orientation of one or more nozzles for delivery of a liquid coolant to the rotor surface facing the stator in the housing enables the rotor to be cooled efficiently at higher rotation speeds and accordingly higher temperatures. Reducing the rotor temperature may protect the further components of the motor from overheating and maintain the electrical performance of the motor.

These advantages are achieved in particular by provision of the nozzle orientation in the direction of the rotor surface facing the stator. This type of cooling of the rotor is significantly more efficient than other cooling possibilities. Thus, for example, in comparison with pure air cooling of the rotor or air convection cooling, liquid cooling achieves a significantly higher dissipation of energy from the rotor.

The above-described embodiment therefore allows a particularly advantageous embodiment of the rotor cooling system. As described above, significantly greater quantities of energy can be dissipated and hence a substantially more even operation of the motor achieved even at high loads and high rotation speeds. Overheating at high loads may therefore be prevented according to one aspect of the invention in a very efficient fashion.

Accordingly, it may be preferred that the nozzles are configured to deliver the cooling liquid only onto the rotor surface regions which are more than or equal to 0% and less than or equal to 30% of the rotor radius away from the rotational axis. To achieve an even as possible a cooling of the entire rotor surface, it has proved favorable if the cooling liquid is delivered through the nozzles mainly onto the rotor surface regions close to the axis. The centrifugal forces occurring then transport the coolant evenly to the rotor regions further away from the axis. This as a whole achieves an even cooling of the entire rotor surface. If the rotor radius is for example 10 cm, the coolant is applied only to the rotor surface regions which lie at most 3 cm from the rotor axis.

In addition or alternatively, it may be advantageous if the rotor surface has recesses, wherein the recesses are configured to conduct the cooling liquid from regions of the rotor surface close to the rotational axis to regions further away from the rotational axis. To ensure as even as possible a cooling of the entire rotor surface, it may be useful for recesses to be made on the rotor surface which deflect the applied stream of cooling liquid on the rotor surface in a predefined direction. The recesses may for example take the form of hemispherical or droplet-shaped channels which, by their specific shape and depth, allow a greater or lesser deflection of the incident coolant stream onto specific surface regions of the rotor. The recesses on the rotor surface may for example have a depth of more than or equal to 0.5 millimetres, further preferably more than or equal to 0.75 millimetres, and further preferably more than or equal to 1 millimeter.

It may furthermore be preferred that recesses with different orientation of the recesses are present on the rotor surface, wherein at least one recess runs concentrically to the rotational axis and a further recess runs non-concentrically to the rotational axis. For efficient distribution of the coolant once applied to the rotor surface, it may be useful if at least two different types of recesses are present on the rotor surface. The different types of recess may differ in particular in their symmetry relative to the rotor axis. One or more recesses may run concentrically about the rotational axis of the rotor. Particularly preferably, this type of the recess may lie closer to the rotational axis of the rotor. A further orientation of the recess may then be non-concentric to the rotational axis of the rotor. For example, these non-concentric recesses may extend rather radially towards the periphery of the rotor. The latter recesses may for example be curved and not straight. It is also possible that the different recesses have a different profile. The latter may dissipate the cooling liquid on the rotor surface in a more targeted fashion.

It may furthermore be advantageous if the cooling liquid is delivered to the rotor surface with a height angle deviation of less than or equal to ±89° relative to the surface normal of the rotor. The phase "less than or equal to" here refers to the absolute amount of the angle. In order to wet the entire rotor surface as evenly as possible, it has proved favorable if the cooling liquid is delivered onto the rotor surface not frontally but with a certain angular deviation. This may in particular contribute to reducing the proportion of cooling liquid which is deflected from the rotor surface directly back in the direction of the stator gap. The surface film of the cooling liquid is kept close to the rotor surface, thus countering the formation of a cohesive liquid film which extends over the entire gap between the rotor and stator. The angular range given concerns the height angle gamma relative to the surface normal of the rotor surface. An angular deviation of 89° relative to the normal means that the cooling liquid is delivered almost parallel to the rotor surface. The prefix indicates whether the liquid is delivered in or against the rotational direction. A lower limit of the angular deviation may preferably be for example ±0.5°, wherein with this deviation, the cooling liquid is delivered almost perpendicularly onto the surface. Depending on operating point, i.e. for example as a function of the rotor temperature and/or rotation speed, it may also be useful for the cooling liquid to be delivered to the surface with varying side angles theta, for example in the form of 0° less than or equal to theta less than or equal to 359°. It is however also possible that, depending on operating point, the delivery direction of the cooling liquid is varied by an adaptable nozzle direction.

It may furthermore be preferred that the nozzles are configured to deliver a liquid coolant through the rotor onto the rotor surface facing the stator. In this embodiment, the cooling liquid is delivered through the rotor onto the rotor surface lying opposite the stator. In this case, the nozzles are attached to the rotor itself or lie in the interior of the rotor. This embodiment allows a particularly precise application of coolant onto the rotor surface, and as a whole the rotor can be cooled efficiently with a smaller coolant flow.

It may furthermore be advantageous that at least one coolant outlet is arranged on the housing wall. To discharge any applied, now warmer coolant from the housing, it has proved advantageous if at least one coolant outlet is provided on the housing wall. The outlet may take the form of a valve which allows escape of collected coolant liquid from the housing as a function of a prevailing pressure or for example also the temperature.

It is also preferably possible that the valve is configured to discharge the coolant from the housing depending on pressure and/or temperature. In particular, if pressure is used as a control variable for switching the outlet valve, it may be suitable for clearing the housing of coolant which is no longer required. Preferably, to control the valve, a pressure range may be given within which the pressure in the housing should be maintained. The pressure range avoids having too great or too small a quantity of coolant in the housing.

In a preferred embodiment, the coolant may be delivered to the rotor surface with a speed greater than or equal to 0.25 l/min and less than or equal to 5 l/min. In order to form a coolant stream onto the surface, which is as targeted as possible, it has proved advantageous if the coolant is delivered within the above-defined speed range. Higher speeds may contribute to the coolant being undesirably conducted back from the rotor surface into the gap between the rotor and the stator. Lower speeds may lead to the initial direction of the coolant flow onto the surface being maintained only for insufficient time. The indicated range is thus suitable for ensuring provision of an adequate and defined coolant flow for a wide rotation speed range of the rotor. Preferably, the coolant may be delivered onto the rotor surface with a speed greater than or equal to 0.5 l/min and less than or equal to 2.5 l/min, and further preferably with a speed greater than or equal to 0.75 l/min and less than or equal to 1.5 l/min.

In an advantageous embodiment, the nozzle or nozzles may be configured to regulate the temporal delivery quantity of liquid coolant as a function of the rotor temperature and/or rotor rotation speed. For needs-appropriate cooling of the rotor surface, it has proved particularly suitable if the coolant quantity delivered to the rotor is not always constant. The coolant quantity delivered per time unit may be adapted in particular as a function of rotor temperature or as a whole as a function of rotor rotation speed. Both variables allow needs-appropriate adaptation of the coolant quantity. Preferably, the nozzle or nozzles may be configured to regulate the temporal delivery quantity of liquid coolant as a function of the rotor temperature and rotor rotation speed.

BRIEF DESCRIPTION OF THE DRAWINGS

The invention is explained in more detail hereinafter on the basis of the figures, wherein individual or multiple features of the figures can be a feature of the invention as such or in combination. Furthermore, the figures are only to be viewed as examples but in no way restrictive.

DETAILED DESCRIPTION OF THE PRESENTLY PREFERRED EMBODIMENTS

Figure 1:
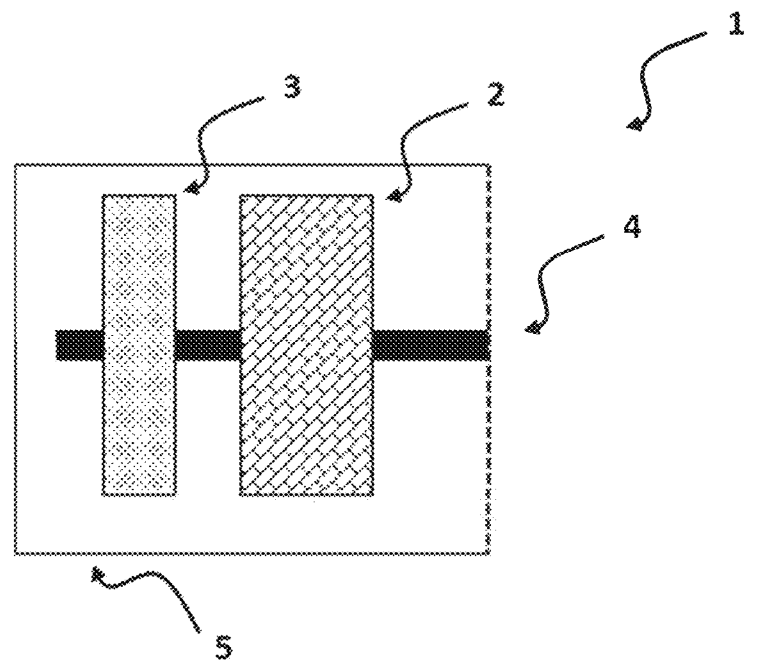
FIG. 1 is a schematic illustration of an extract of an axial flow motor according to the prior art.

FIG. 1 shows schematically an extract of an axial flow motor 1 according to the prior art. The illustrated part of the axial flow motor 1 has a disc-shaped stator 2 and opposite this, separated by a gap, a disc-shaped rotor 3. The rotor 3 and stator 2 share the same rotational axis 4 and are accommodated in a housing 5.

Figure 2:
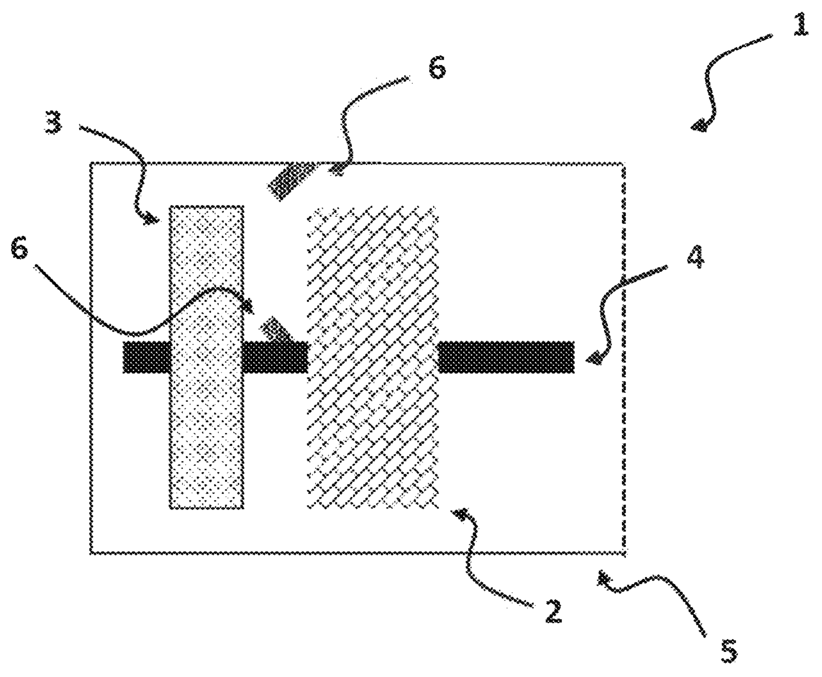
FIG. 2 is a schematic illustration of an extract of an axial flow motor.

FIG. 2 shows schematically an extract of an axial flow motor 1 according to one aspect of the invention. As well as the elements described above in FIG. 1, FIG. 2 also shows that multiple nozzles 6 are arranged on the housing 5 and on the rotational axis 4. The rotational axis 4 may for example be configured as a shaft. The nozzles 6 are configured such that a coolant can be delivered from the nozzles 6 in the direction of the surface of the rotor 3. In addition to the nozzles 6 shown, further nozzles may be arranged on the housing 5 or on the stator 2, or on a shaft lying on the rotational axis 4.

Figure 3:
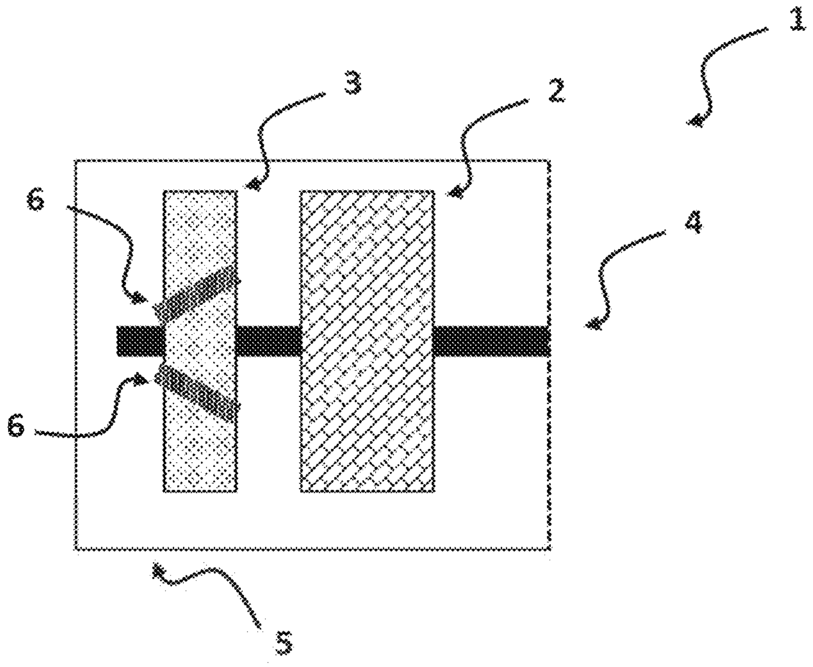
FIG. 3 is a schematic illustration of an extract of an axial flow motor.

FIG. 3 shows schematically an extract of an axial flow motor according to one aspect of the invention. As well as the possibility of delivering a coolant from the direction of the stator 2, coolant may also be delivered through the rotor 3 onto the side facing the stator 2. The coolant is thus introduced through the surface of the rotor 3 facing away from the stator 2, and leaves the rotor 3 on the other surface side. In this way, an efficient cooling of the surface side of the rotor 3 facing the stator 2 can be achieved.

Figure 4:
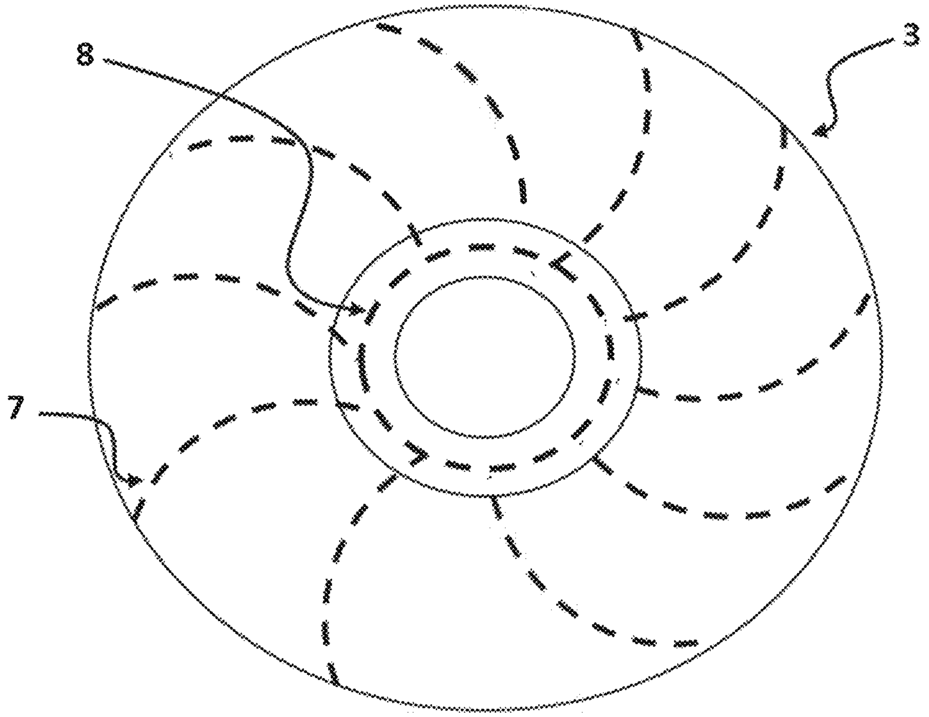
FIG. 4 shows a rotor surface according to the invention with recesses.

FIG. 4 shows a surface of a rotor 3 according to one aspect of the invention with recesses 7, 8. For targeted dissipation of the coolant on the surface of the rotor 3, recesses 7, 8 may be present on the surface of the rotor 3 facing the stator 2. To ensure an improved cooling of the entire surface, the recesses 7, 8 may have different orientations. Thus recesses 8 may be arranged relative to the rotational axis. However, recesses 7 may also be arranged non-concentrically on the surface of the rotor 3. It is also possible that the two recesses 7, 8 are connected together. The two recesses may also have different profiles. These recesses 7, 8 can guarantee an even and complete wetting of the surface of the rotor 3 with coolant.

Thus, while there have shown and described and pointed out fundamental novel features of the invention as applied to a preferred aspect thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. An axial flow motor comprising:

a housing;

at least one disc-shaped stator arranged in the housing;

at least one disc-shaped rotor, which is arranged opposite the disc-shaped stator along a rotational axis of the axial flow motor and separated from the at least one disc-shaped stator by an air gap; and one or more nozzles are arranged in the housing and are configured to deliver a liquid coolant to a rotor surface facing the stator, wherein the rotor surface facing the stator has a plurality of recesses configured to conduct the liquid coolant from regions of the rotor surface close to the rotational axis to regions further away from the rotational axis, and wherein different orientations of the plurality of recesses are present on the rotor surface facing the stator, wherein at least one recess of the plurality of recesses runs concentrically to the rotational axis and a further recess of the plurality of recesses runs non-concentrically to the rotational axis.

2. The axial flow motor as claimed in claim 1, wherein the one or more nozzles are configured to deliver the liquid coolant only onto rotor surface regions which are more than or equal to 0% and less than or equal to 30% of a rotor radius away from the rotational axis.

3. The axial flow motor as claimed in claim 1, wherein the liquid coolant is delivered to the rotor surface with a height angle deviation of less than or equal to ±89° relative to a surface normal of the rotor.

4. The axial flow motor as claimed in claim 1, wherein the one or more nozzles are configured to deliver the liquid coolant through the rotor onto the rotor surface facing the stator.

5. The axial flow motor as claimed in claim 1, further comprising at least one coolant outlet arranged on a housing wall.

6. The axial flow motor as claimed in claim 5, wherein the one or more nozzles are configured to regulate a temporal delivery quantity of the liquid coolant as a function of a rotor temperature and/or a rotor rotation speed.

7. The axial flow motor as claimed in claim 1, wherein the liquid coolant is delivered to the rotor surface facing the stator with a speed greater than or equal to 0.25 l/min and less than or equal to 5 l/min.

8. The axial flow motor as claimed in claim 1, wherein the one or more nozzles are configured to regulate a temporal delivery quantity of the liquid coolant as a function of a rotor temperature and a rotor rotation speed.

9. The axial flow motor as claimed in claim 1, wherein the one or more nozzles are arranged on a stator shaft.

10. The axial flow motor as claimed in claim 1, wherein the one or more nozzles are configured to deliver the liquid coolant to prevent formation of a continuous liquid film across the air gap.

* * * * *